NEWCOMB & BYRD.
Rotary Cultivator.
No. 26,699. Patented Jan. 3, 1860.
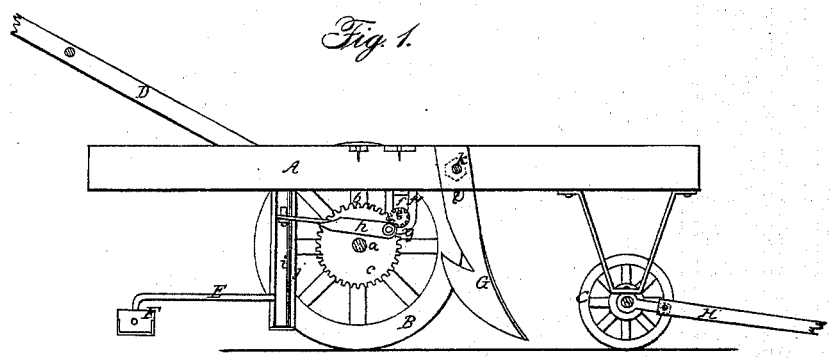
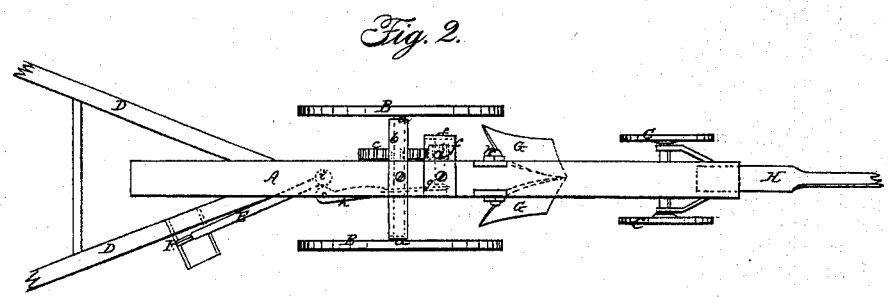
Witnesses:
A. W. W. Maddux
J. W. S. Biglow
Inventor:
Thomas Newcomb
G. W. Byrd

UNITED STATES PATENT OFFICE.

THOMAS NEWCOMB AND G. W. BYRD, OF SMITH'S FORK, TENNESSEE.

IMPROVEMENT IN COTTON-CULTIVATORS.

Specification forming part of Letters Patent No. 26,699, dated January 3, 1860.

*To all whom it may concern:*

Be it known that we, THOMAS NEWCOMB and G. W. BYRD, both of Smith's Fork, in the county of Hardin and State of Tennessee, have invented a new and Improved Cotton-Scraper; and we do hereby declare that the following is a full, clear, and exact description of the same, reference being had to the accompanying drawings, forming a part of this specification, in which—

Figure 1 represents a sectional side elevation of our invention. Fig. 2 is a plan or top view of the same.

Similar letters of reference in both views indicate corresponding parts.

To enable those skilled in the art to make and use our invention, we will proceed to describe it.

The beam A, which is similar to the beam of a plow, is supported by two-wheels, B, behind, and by two fore wheels, C C, and it is furnished with two handles, D, whereby the course of the machine may be governed in the same manner as with plows.

The hind wheels, B, are firmly secured to their axle $a$, that has its bearings in a double-armed pendant, $b$. Mounted on this axle is a cog-wheel, $c$, that gears into a pinion, $d$, which runs on an arbor, $e$, that has its bearings in two pendants, $f$, as clearly shown in the drawings. A crank, $g$, which is rigidly attached to the end of the arbor $e$, connects by means of a pinion, $h$, with a rock-shaft, $i$, that is placed vertically under the rear end of the beam, having one of its bearings in the beam itself and the other in a standard, $j$, as clearly represented in Fig. 1.

From the rock shaft $i$ there extends an arm, E, in a horizontal direction. Its end is bent down and it bears the hoes F, that work as close down to the ground as may be desired. These hoes are placed with their backs together, so as to present a cutting-edge in each side and parallel with the row of cotton, corn, or other plant through which the machine is to run.

In front of the hind wheels and attached to the beam are two plow-shares, G, one a right-handed and the other a left-handed one. A screw-bolt, $k$, serves to retain them, one on each side of the beam, and they are so arranged by means of slots $l$ that they may be raised or lowered at pleasure.

The fore wheels, C, turn on their axles like those of a wagon, and screwed to the axle-tree of these wheels is the draft-pole H, whereby the machine is guided. This machine is intended to be drawn by two horses, and it accomplishes its work quickly, easily, and without injury to the growing crops.

What we claim as new, and desire to secure by Letters Patent, is—

The arrangement, in combination with the plows G G, of the central beam, A, double-acting hoe F, cog-pinions $c$ $d$, crank $g$, rock-shaft $i$, and pitman $h$, all in the manner set forth, for the purpose specified.

THOMAS NEWCOMB.
G. W. BYRD.

Witnesses:
W. W. MADDUX,
W. S. BIGBIE.